United States Patent [19]

Yonekura et al.

[11] Patent Number: 5,006,728

[45] Date of Patent: Apr. 9, 1991

[54] DUAL PATH POWER SUPPLY CIRCUIT WITH TIME CONTROLLED SWITCHING

[75] Inventors: Mikio Yonekura; Hiroyuki Tojo, both of Hachioji, Japan

[73] Assignee: Fanuc Ltd., Yamanashi, Japan

[21] Appl. No.: 511,897

[22] Filed: Apr. 23, 1990

Related U.S. Application Data

[63] Continuation of Ser. No. 265,861, filed as PCT JP88/00091 on Feb. 2, 1988, published as WO88/06316 on Aug. 25, 1988, abandoned.

[30] Foreign Application Priority Data

Feb. 14, 1987 [JP] Japan .................................. 62-30676

[51] Int. Cl.[5] .............................................. H03K 3/01

[52] U.S. Cl. ............................... 307/296.10; 307/311; 307/30; 307/140; 323/299

[58] Field of Search .................. 307/242, 296 R, 270, 307/243, 355, 356, 360, 311, 592, 596, 600, 603, 30, 112, 117, 140; 323/282, 285, 299, 351; 340/813, 815.03

[56] References Cited

U.S. PATENT DOCUMENTS

| | | | |
|---|---|---|---|
| 3,104,323 | 9/1963 | Over, Jr. et al. | 307/311 |
| 3,705,342 | 12/1972 | Dalke | 323/22 |
| 4,137,557 | 1/1979 | Ciarniello et al. | 361/92 |
| 4,421,993 | 12/1989 | Bloomer | 307/126 |
| 4,443,712 | 4/1984 | Gokita | 307/140 |
| 4,585,986 | 4/1986 | Dyer | 323/281 |
| 4,616,142 | 10/1986 | Upadhyay et al. | 307/242 |
| 4,659,942 | 4/1987 | Volp | 307/19 |
| 4,760,293 | 7/1988 | Hebenstreit | 307/270 |
| 4,827,366 | 5/1989 | McNally et al. | 323/299 |
| 4,929,936 | 5/1990 | Friedman et al. | 340/815.03 |

FOREIGN PATENT DOCUMENTS

| | | |
|---|---|---|
| 53-142825 | 12/1978 | Japan . |
| 61-279918 | 12/1986 | Japan . |

*Primary Examiner*—Stanley D. Miller
*Assistant Examiner*—T. Cunningham
*Attorney, Agent, or Firm*—Armstrong, Nikaido, Marmelstein, Kubovcik & Murray

[57] ABSTRACT

The power supply circuit supplies electric current to a plurality of circuits in turn. The power supply circuit has a power source (5); a resistor (4); one end of which is connected to the power source (5); a first current path (1), one end of which is connected to the other end of the resistor (4), and including a first driver circuit (12); a second current path (2), one end of which is connected to the other end of the resistor (4), and including a second driver circuit (22); and a controller (3) which drives the first and second driver circuits (12, 22) alternatively. The controller (3) controls the on-and-off timings of the first and second driver circuits (12, 22) so that the first current path (12) is maintained in the ON state for a time equal to or more than a predetermined necessary time, and the second current path (22) is broken for a time equal to or less than an allowed time.

2 Claims, 3 Drawing Sheets

KEY SWITCH READ-OUT PORTION
LIGHT-EMITTING DISPLAY PORTION

KEYBOARD
LED
LED
WIRING PORTION
PRINTED CIRCUIT BOARD (PCB)
DRIVER
DRIVER
DRIVER
RECEIVER
RECEIVER
DRIVER
DRIVER
+5V
+5V
+5V
DECODER
CONTROLLER
OUTPUT REGISTER

KEY SWITCH READ-OUT PORTION
LIGHT-EMITTING DISPLAY PORT

KEYBOARD
WIRING PORTION
PRINTED CIRCUIT BOARD (PCB)
KEY ADDRESS SIGNAL
READ KEY SIGNAL
DRIVER
DECODER
ENABLE
VOLT-DET RECEIVER
DISABLE
OUTPUT REGISTER
CONTROLLER
LED
+5V
12-1
12-2
12-3
4-1
4-2
13-1
13-2
10
11
1'
2'
3
20
21-1
21-2
22-1
22-2

DUAL PATH POWER SUPPLY CIRCUIT WITH TIME CONTROLLED SWITCHING

This application is a continuation of application Ser. No. 265,861 filed Oct. 13, 1988, now abandoned.

TECHNICAL FIELD

The present invention relates to a power supply circuit.

BACKGROUND ART

General keyboard units used as input equipment in computer systems or word processors are provided with indication functions by light emission, to inform an operator of various states of the keyboard, or of the systems wherein the keyboard units are used, for example, "SYSTEM READY", "POWER ON", "HOLD", "FAULT" and the like, in addition to keys for letters and numerals and the like, and key switches corresponding to the keys. .p FIG. 1 is a simplified diagram of a conventional keyboard unit. The keyboard unit shown in FIG. 1 consists of a keyboard comprising a plurality of keys switches 11 which are placed in correspondence to keys and form a matrix, and light-emitting devices (LED) 21-1, 21-2; a printed circuit board (PCB) comprising a controller 3, a decoder 10, drivers 12-1, 12-2, 12-3, 22-1, 22-2, receivers 13-1, 13-2, resistors 4-1, 4-2, 4-3, 4-4, and an output register 20; and wiring portions comprising wires connecting the keyboard and the PCB. From the view point of the functions of the keyboard unit, the keyboard unit is divided into a key switch read-out portion 1' for reading the key switches 11, a light-emitting display portion 2' having a display function of informing an operator of the aforementioned various states by light emission, and a controller 3 controlling the key switch read-out portion 1' and the light-emitting display portion 2'. The constructions and the functions of the above three portions are described hereinafter.

The controller 3, which has a microprocessor, outputs a key address signal to the key switch read-out portion 1' for reading out which key is pushed, and receives the results of the reading. The controller 3 also controls the light emission by the LEDs 21-2, 21-2 in the light-emitting display portion 2.

The key switch read-out portion 1' comprises: a plurality of key switches 11 which are placed in correspondence to the keys and form a matrix; the diodes accompanying the key switches; drivers 12-1, 12-2, 12-3 provided in correspondence to the lines of the matrix; the receivers 13-1, 13-2 provided in correspondence to the rows of the matrix; the resistors 4-1, 4-2, each of which is connected at one terminal to the input side of the corresponding one of the receivers 13-1, 13-2, and at the other terminal to a voltage source of a higher voltage (+5V); and a decoder 10. One end of each key switch 11 in each line of the matrix is connected through a diode to the output of the corresponding one of the drivers 12-1, 12-2, 12-3, and the other end of each key switch 11 in each row of the matrix is connected to the input of the corresponding one of the receiver 13-1, 13-2.

The aforementioned key address signal from the controller 3 selects one of the drivers 12-1, 12-2, 12-3, each of which corresponds to one of the lines in the matrix. The meaning of the key address signal is decoded at the decoder 10, and the decoder 10 outputs a drive input to the selected driver among the drivers 12-1, 12-2, 12-3. Upon receiving the drive input, the output of the selected driver among the drivers 12-1, 12-2, 12-3 is brought to a lower voltage level.

At this time, if none of the key switches 11 connected through the diodes to the outputs of the drivers 12-1, 12-2, 12-3 is closed, all input of the receivers 13-1, 13-2 remain at a higher voltage level (+5V), but if any of the key switches 11 connected to the outputs of the drivers 12-1, 12-2, 12-3 is closed, the input of the receiver 13-1 or 13-2 to which the aforementioned other end of the key switch is connected, is brought to the lower voltage level, and thus the position of the operated key on the keyboard is read.

The diodes connected in series to the key switches 11 are provided to prevent a misreading due to the forming of a plurality of the circuits through a plurality of the key switches when a plurality of the key switches are operated at the same time.

The aforementioned light-emitting display portion 2' comprises the output register 20, the drivers 22-1, 22-2 for the light emitting devices (LED) 21-1, 21-2, the light-emitting devices (LED) 21-1, 21-2, and the resistors 4-3, 4-4. A command for an on-and-off control of each of the LEDs 21-1, 21-2 from the controller 3 is sent through the output register 20 to the drivers 22-1, 22-2. Upon receiving the command input from the controller 3, the output of each of the drivers 22-1, 22-2 is brought to the lower level. Each output of the drivers 22-1, 22-2 is connected through the corresponding one of the resistors 4-3, 4-4 to one end of the corresponding one of the LEDs 21-1, 21-2, and the other ends thereof are connected to a voltage source of a higher voltage +5V.Therefore, when the output of any of the drivers 22-1, 22-2 is brought to the lower voltage, the corresponding LED 21-1, 21-2 is turned on and emits light. The outputs of the drivers 22-1, 22-2 which do not receive the command from the controller 3 remain at the higher level, and therefore, the corresponding LEDs 21-1, 21-2, which are connected through the corresponding resistors 4-3, 4-4 to the outputs of the drivers 22-1, 22-2, are not turned on, and do not emit light.

In the above mentioned keyboard equipment, the resistors 4-1, 4-2 are provided at the input side of the receivers 13-1, 13-2 in the key switch read-out portion 1', and the inputs of the receivers 13-1, 13-2 are connected through the resistors 4-1, 4-2 to the +5V voltage source. On the other hand, in the light-emitting display portion 2', one end of each of the LEDs 21-1, 21-2 is connected to the corresponding one of the resistors 4-3, 4-4, and the other end is connected to the +5V voltage source.

In this situation, if the resistors connected to the +5V voltage source and the wires accompanying the resistors are commonly used for both the key switch read-out portion 1' and the light-emitting display portion 2', the number of necessary resistor and wires can be reduced.

Nevertheless, if the above one end of each of the LEDs 21-1, 21-2 is connected to the input level of the corresponding one of the receivers 13-1, 13-2, when one of the LEDs 21-1, 21-2 is turned on, the input level of the corresponding one of the receivers 13-1, 13-2 becomes lower than the +5V level due to a voltage drop through the corresponding one of the resistors 4-1, 4-2, and this may prevent a correct detection by the receivers 13-1, 13-2 of the OFF state of the key switch 11.

DISCLOSURE OF THE INVENTION

An object of the present invention is to provide a power supply circuit by which it is possible to supply electric power from a common power source through a common resistor, without a voltage drop, to both a current path which needs a power supply for at least a predetermined time and another current path which allows a break of a power supply for at least the predetermined time, to lower the number of parts consituting the power supply circuit itself, and to reduce the scale of the circuit.

A power circuit according to the present invention comprises: a first current path which needs a power supply for at least a predetermined time and a second current path which allows a break of a power supply for at least the predetermined time; a voltage from a power source is applied through a resistor in parallel to one end of each of the first and second current paths, each of the first and second current paths having first and second driver circuits, respectively, each of which driver circuits controls a current from the power source in the corresponding current path; each of the first and second driver circuits is driven alternatively by a controller; the controller controls the on-and-off timings of the first and second driver circuits so that the first current path is maintained in the ON state for a time equal to or more than the time needed, and the second current path is broken for a time equal to or less than the time allowed.

BEST MODE FOR CARRYING OUT THE INVENTION

Figure 2:
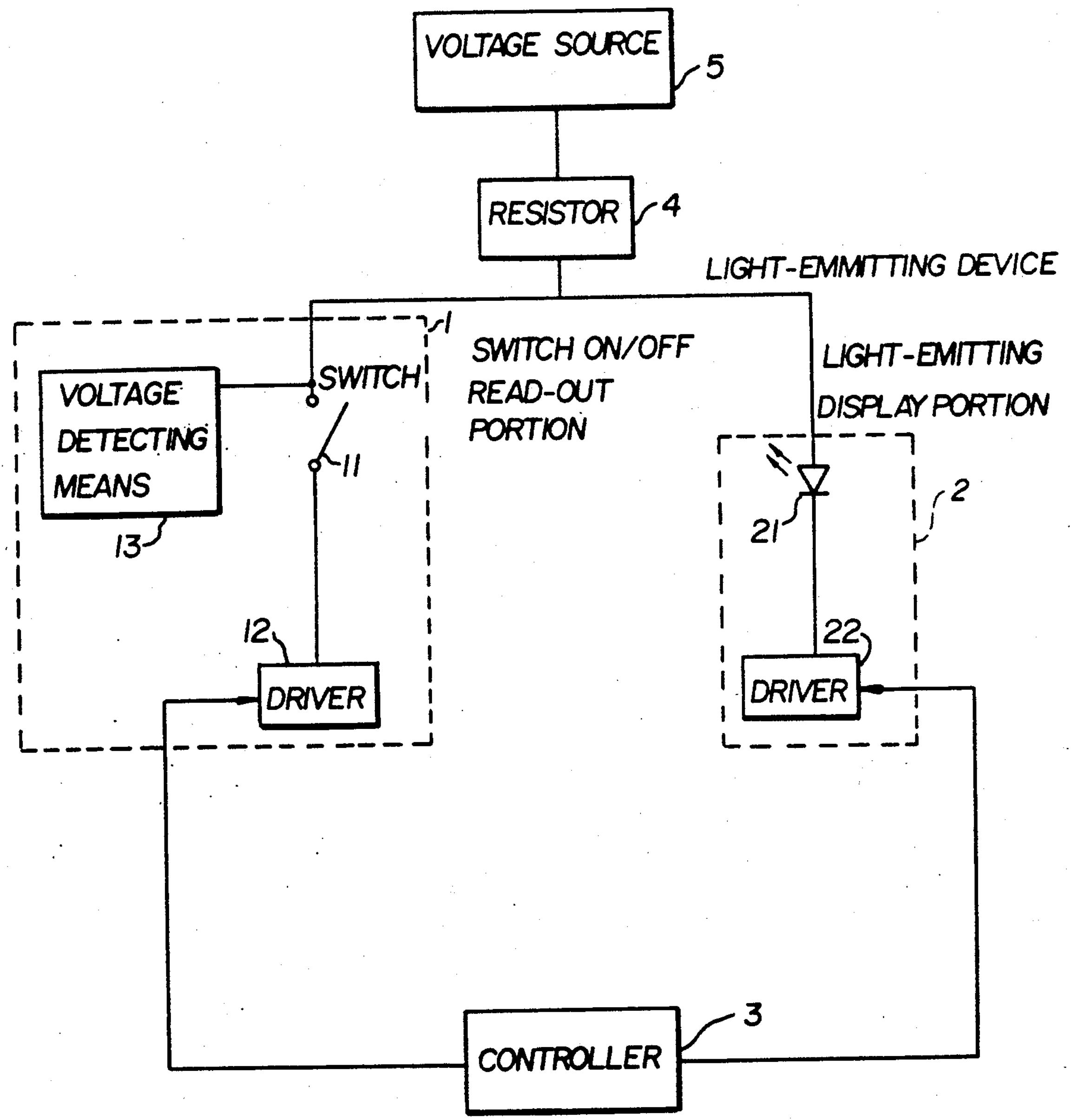
FIG. 2 shows the basic construction of the present invention.

FIG. 2 shows the basic construction of the present invention. In FIG. 2, reference numeral 1 is a first current path, 2 is a second current path, 3 is a controller, 4 is a resistor, and 5 is a voltage source.

The resistor 4 is connected at one end to the power source 5, and at the other end to one end of each of the first and second current paths 1, 2. Each of the first and second current paths 1, 2 has first and second driver circuits 12, 22, respectively, and the first and second driver circuits 12, 22 are driven alternatively by a controller 3. The first current 1 path needs a power supply for at least a predetermined time and a second current path 2 allows a break of a power supply for at least the predetermined time. The controller 3 controls the on-and-off timings of the first and second driver circuits 12, 22 so that the first current path 1 is maintained in the ON state for a time equal to or more than the time needed, and the second current path 2 is broken for a time equal to or less than the time allowed.

In the above mentioned construction, driving the first and second driver circuits 12, 22 alternatively by the controller 3 prevents a supply of current to both the first and second current paths 1, 2 at the same time, and the current is supplied to both in a time-sharing manner. Therefore, the above mentioned construction makes it possible to supply electric power from a common power source through a common resistor, without a voltage drop, to both current paths which need a power supply for at least a predetermined time and another current path which allows a break of a power supply for at least a predetermined time, lowers the number of parts constituting the power supply circuit itselt, and reduces the circuit to a smaller scale.

In addition to the above construction, FIG. 2 shows, by a dashed line 1, a construction wherein a switch 11 is connected between the first driver circuit 12 and the resistor 4 in the first current path 1, and a voltage detecting means 13 which detects a voltage at the resistor 4 side of the switch 11 is provided, and accordingly, a switch on/off detecting circuit is constructed.

Further, FIG. 2 shows, by another dashed line 2, a construction wherein a light-emitting device 21 is connected between the second driver circuit 22 and the resistor 4 in the second current path 2, and a light-emitting device driving circuit is realized.

The construction of FIG. 2 makes it possible to supply electric power from a common power source through common resistor in a timer-sharing manner, without a voltage drop, to both the switch on/off detecting circuit 1 and the light-emitting device driving circuit 2, because the time necessary to supply power intermittenly to the switch on/off detecting circuit (the first current path) 1 by driving the first driver circuit 12 to detect whether the switch is opened or closed in the switch on/off detecting circuit (the first current path) 1, is much shorter than the time allowed for the light-emitting device driving circuit (the second current path) 2 to break, i.e., the time necessary to break the current in the light-emitting device driving circuit (the second current path) 2, is so short that the break cannot be seen by the naked eye.

Figure 3:
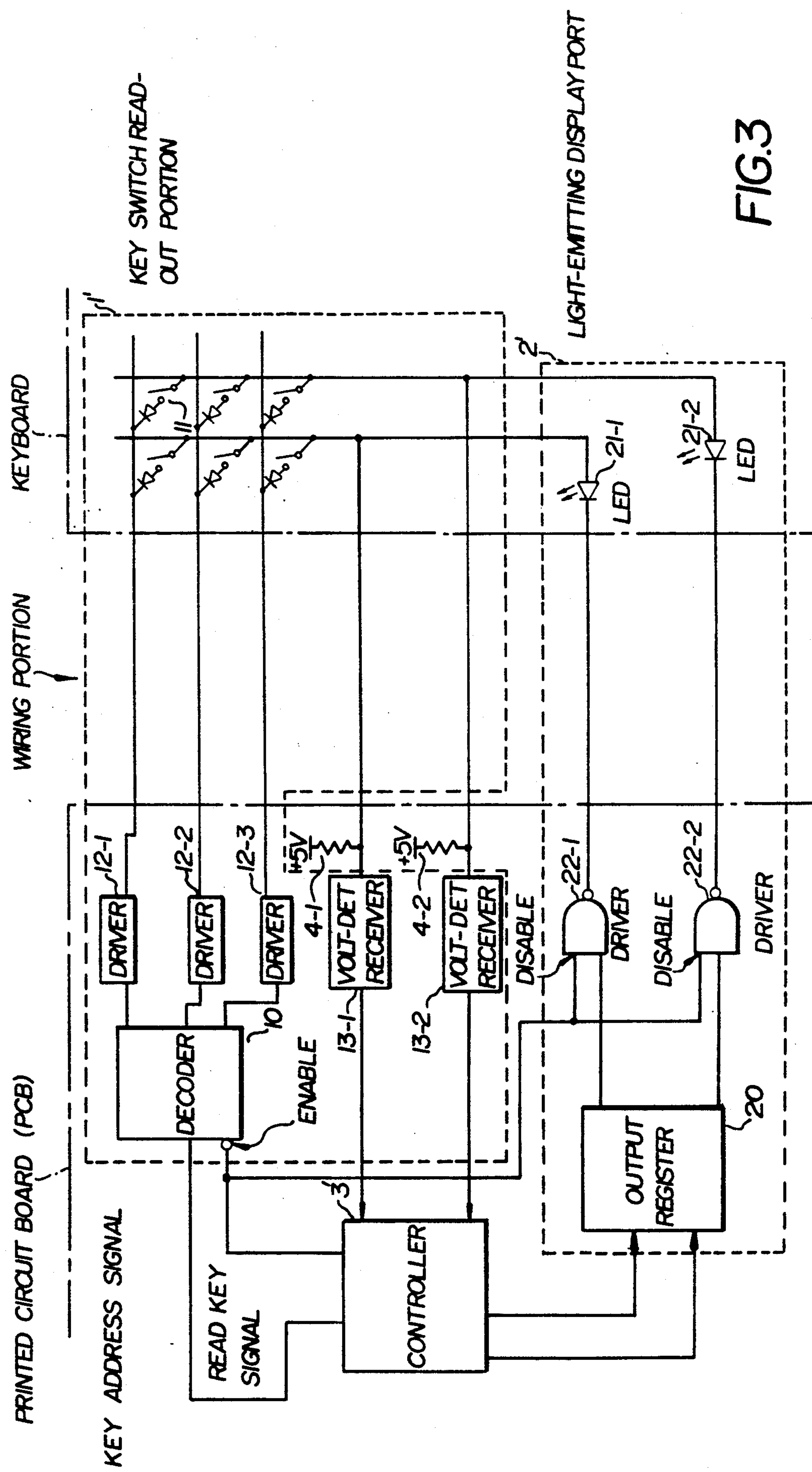
FIG. 3 shows a construction of keyboard equipment using the power supply circuit according to the present invention.

FIG. 3 is a simplified diagram of the construction of keyboard equipment according to the present invention.

Figure 1:
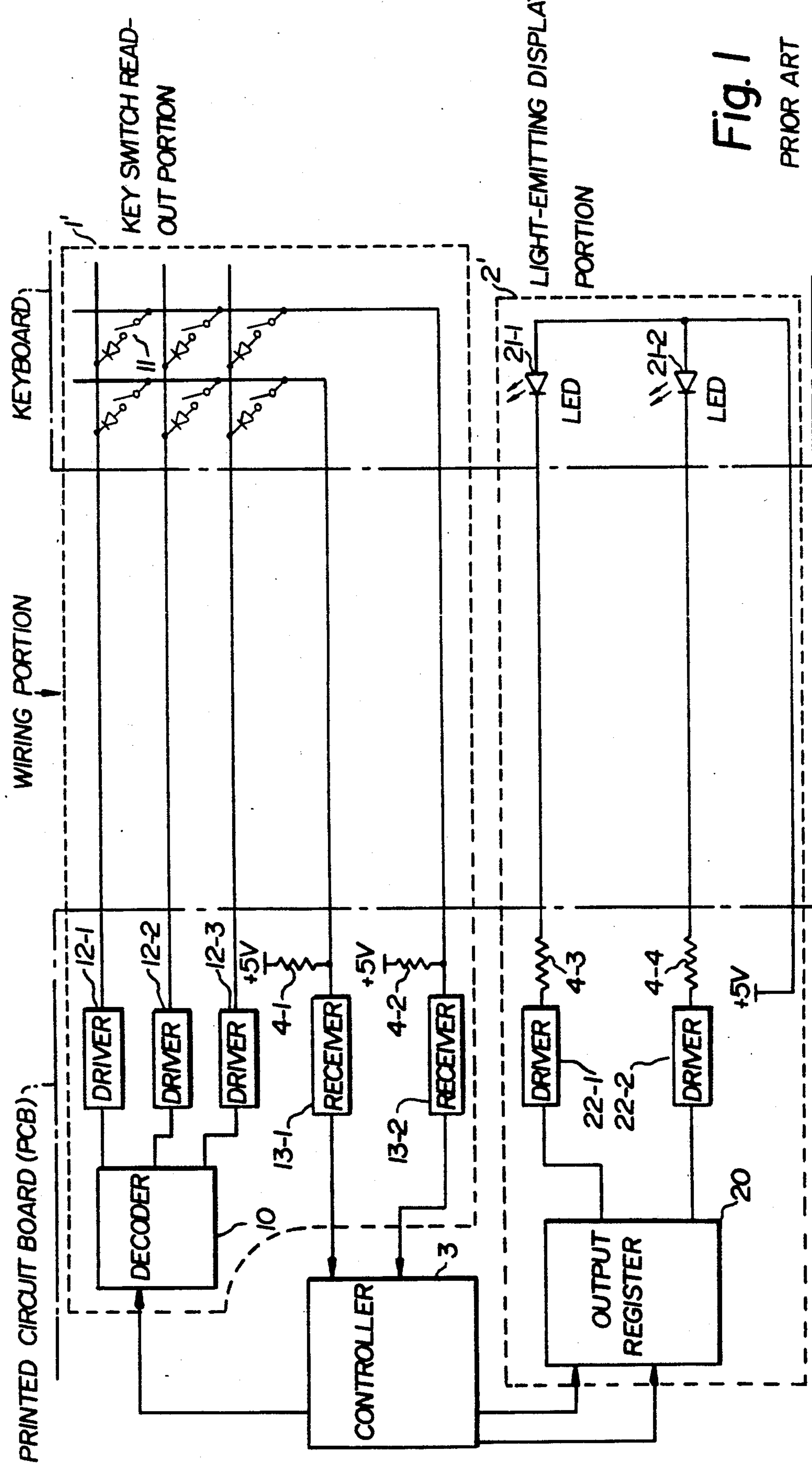
FIG. 1 shows a construction of the conventional keyboard equipment.

Although much of the basic construction shown in FIG. 3 is the same as the corresponding construction of FIG. 1, difference exist: first, the terminals at the higher voltage sides of the LEDs 21-1, 21-2 in the light-emitting display portion 2' are connected to the input levels of the receivers 13-1, 13-2 (which correspond to the voltage detecting circuit 13 in FIG. 2) in the key switch read-out portion 1'; second, the read key signal from the controller 3' is applied to an input terminal of the decoder 10 in the key switch read-out portion 1' as a signal to enable the output of the decoder 10; and third, the above read key signal is also applied to disable the aforementioned drivers 22-1, 22-2 for the LEDs in the light-emitting display portion 2'.

First, in the key switch read-out portion 1', as long as the read key signal (negative logic) from the controller 3' is at the higher level, no effective output appears from any of the output terminals of the decoder 10, the outputs of all the drivers 12-1, 12-2, 12-3 remain at the higher level, and the inputs of the receivers 13-1, 13-2 are +5 V. In this situation, if a command to emit a light is output from the controller 3', i.e., if the bit corresponding to the LED 21-1 or 21-2, which should emit a light, the output register 20 becomes "1", the output of the corresponding drivers 22-1, 22-2 for the LEDs in the light-emitting display portion 2', is brought to the lower level, because one input of each NAND circuit which realizes one or the other of the drivers 22-1, 22-2 for the LEDs is the read key signal which is at the higher level, and the other input of the corresponding NAND circuit is at the higher level as the corresponding bit of the output register 20 is "1". At this time, through the resistor connected at the one end to the LED which should emit light, among the resistors 4-1 and 4-2 in the key switch read-out portion, the current flows from the +5 V voltage source to the LED 21-1 or 21-2, and accordingly, the LED 21-1 or 21-2 emits light.

When the controller 3' reads the states of the key switch 11 in the key switch read-out portion 1', the controller 3' commands which driver among the drivers 12-1, 12-2, 12-3 should be driven by the aforementioned key address signal, and brings the read key signal to the lower level. Accordingly, the decoder 10 is enabled, and the driver (12-1, 12-2, or 12-3) commanded by the key address signal is driven, and therefore, the output of the driver is brought to the lower level.

At the same time, the read key signal which has been brought to the lower level is applied to each of the drivers 22-1, 22-2 for the LEDs in the light-emitting display portion 2' to bring one input of each of the NAND circuits to the lower level, and then holds the outputs of all the drivers 12-1, 12-2, 12-3 at the higher level, i.e., disables the drivers 22-1, 22-2, and thus no current flows in any LED during the operation of the key switch read-out portion 1'. When the key switch 11 is OFF, no voltage drop occurs in the resistors 4-1, 4-2 in the key switch read-out portion 1', and the input levels of the receivers 13-1, 13-2 remain at the higher level (+5 V), and therefore, no voltage detection error occurs at the receiver when the key switch 11 is open. Similar to the aforementioned construction of FIG. 2, the time interval for which the current for the LEDs is broken to operate the key switch read-out portion 1' is so short that it cannot be seen by the naked eye. Further, the process of reading the states of the key switch 11 is the same as that mentioned in the construction of FIG. 1.

In the construction of FIG. 3, a smaller number of parts is used than in conventional keyboard equipment, but keyboard equipment having the same function as conventional keyboard equipment can be realized.

Industrial Applicability

The power supply circuit according to the present invention is useful in systems having a plurality of circuits each of which can be operated by supplying an electric current in a time-sharing manner.

We claim:

1. A power supply circuit being connected to a power source through a resistance, said supply circuit comprising:

a first current path including, (a) a first switching means connected to said resistance and for active operation by receiving power for a first predetermined time period, and (b) a first driver circuit means, connected to said first switching means for controlling current flow through said first current path;

a second current path including, (a) a light emitting display device connected to said resistance and operated to be active by receiving power for a second predetermined time period, and (b) a second driver circuit means, connected to said light emitting display device, for controlling current flow through said current path; and a driver circuit controller means, connected to said first and second driver circuit means, for controlling said first and second driver circuits such that power is alternately supplied between said first and second current path to operate said first switching means for the first predetermined time period and subsequently power is applied to said second current path to operation aid light emitting display device for the second predetermined time period.

2. A power supply circuit for being connected to a power source through a load, said power supply circuit comprising:

a first current path including, (a) a switch having a first contact connected to the load and to a voltage detector, and (b) a first driver circuit means, coupled to a second contact of said switch, for controlling current flow through said first current path;

a second current path, including, (a) a light emitting display device connected on one side thereof to the load, (b) a second driver circuit means, connected to another side of said light emitting display device, for controlling current flow through said second current path; and a driver circuit controller means, coupled to said first and second driver circuit means and said voltage detector, for controlling an application of power through said first and second current paths, such that power is alternately supplied to said first and second current paths, and further such that power is applied to said first current path for a predetermined time and concurrently power is not applied to said second current path for the predetermined time.

* * * * *